United States Patent
Salter et al.

(10) Patent No.: US 9,987,974 B2
(45) Date of Patent: Jun. 5, 2018

(54) LIGHTING SYSTEM HAVING POINTER DEVICE

(71) Applicant: Ford Global Technologies, LLC, Dearborn, MI (US)

(72) Inventors: Stuart C. Salter, White Lake, MI (US); Pietro Buttolo, Dearborn Heights, MI (US); Christopher Anthony Danowski, Rochester, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/348,132

(22) Filed: Nov. 10, 2016

(65) Prior Publication Data

US 2017/0368984 A1     Dec. 28, 2017

Related U.S. Application Data (63) Continuation-in-part of application No. 15/192,726, filed on Jun. 24, 2016.

(51) Int. Cl.
| | |
|---|---|
| *B60Q 1/26* | (2006.01) |
| *B60Q 1/24* | (2006.01) |
| *F21V 23/04* | (2006.01) |
| *F21V 21/30* | (2006.01) |
| *F21V 19/00* | (2006.01) |
| *F21V 14/02* | (2006.01) |
| *B60Q 1/00* | (2006.01) |
| *F41G 1/35* | (2006.01) |
| *F21Y 115/10* | (2016.01) |

(Continued)

(52) U.S. Cl.
CPC ........... *B60Q 1/245* (2013.01); *B60Q 1/0035* (2013.01); *B60Q 1/0076* (2013.01); *B60Q 1/2611* (2013.01); *F21V 14/02* (2013.01); *F21V 19/003* (2013.01); *F21V 21/30* (2013.01); *F21V 23/0435* (2013.01); *F41G 1/35* (2013.01); *B60Q 2900/30* (2013.01); *F21W 2101/02* (2013.01); *F21Y 2115/10* (2016.08); *H05B 33/0845* (2013.01); *H05B 33/0857* (2013.01); *H05B 37/0272* (2013.01)

(58) Field of Classification Search
CPC .. B60Q 1/0017; B60Q 1/0035; B60Q 1/0076; B60Q 1/245; B60Q 1/2611; F21V 14/02; F21V 19/003; F21V 21/30; F21V 23/0435; F41G 1/32; F41G 1/34; F41G 1/35
USPC ................ 362/464, 487, 508, 523–532, 540, 362/543–549; 42/111, 114, 117, 146
See application file for complete search history.

(56) References Cited

U.S. PATENT DOCUMENTS

| | | |
|---|---|---|
| 6,260,988 B1 | 7/2001 | Misawa et al. |
| 7,245,254 B1 | 7/2007 | Vogel et al. |

(Continued)

FOREIGN PATENT DOCUMENTS

| | | |
|---|---|---|
| CN | 202357840 U | 8/2012 |
| CN | 104869728 A | 8/2015 |

(Continued)

*Primary Examiner* — Jason Moon Han
(74) *Attorney, Agent, or Firm* — Jason Rogers; Price Heneveld LLP (57) ABSTRACT

A lighting system is provided herein. The lighting system includes a spotlight is mounted to a vehicle, a controller for operating the spotlight, and a pointer device for specifying an intended target. The controller aims the spotlight in the direction of the intended target based on input provided by the pointer device.

20 Claims, 6 Drawing Sheets

(51) Int. Cl.
  *F21W 101/02*  (2006.01)
  *H05B 33/08*  (2006.01)
  *H05B 37/02*  (2006.01)

(56) References Cited

U.S. PATENT DOCUMENTS

| | | |
|---|---|---|
| 7,354,182 B2 | 4/2008 | Bartels |
| 8,103,414 B2 | 1/2012 | Boss et al. |
| 8,408,765 B2 | 4/2013 | Kuhlman et al. |
| 8,937,454 B2 | 1/2015 | Baarman et al. |
| 9,194,168 B1 | 11/2015 | Lu et al. |
| 9,442,888 B2 | 9/2016 | Stanfield et al. |
| 2007/0030136 A1 | 2/2007 | Teshima et al. |
| 2008/0186720 A1 | 8/2008 | Verbrugh |
| 2012/0020101 A1 | 1/2012 | Pastrick et al. |
| 2013/0009855 A1 | 1/2013 | Gaily et al. |
| 2013/0154821 A1 | 6/2013 | Miller et al. |
| 2015/0069916 A1 | 3/2015 | Fleming et al. |
| 2015/0070925 A1 | 3/2015 | Berg-Hagen |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0082880 A1 | 3/2016 | Co et al. |

FOREIGN PATENT DOCUMENTS

| | | |
|---|---|---|
| CN | 105303642 A | 2/2016 |
| EP | 2719580 A1 | 4/2014 |
| JP | 2000052859 A | 2/2000 |
| WO | 2008093266 A1 | 8/2008 |

LIGHTING SYSTEM HAVING POINTER DEVICE

CROSS REFERENCE TO RELATED APPLICATION

This application is a continuation-in-part of U.S. patent application Ser. No. 15/192,726, filed Jun. 24, 2016, entitled "VEHICLE LIGHTING SYSTEM HAVING A SPOTLIGHT," the entirety of which is incorporated herein by reference.

FIELD OF THE INVENTION

The present invention generally relates to lighting systems of a vehicle, and more particularly, to lighting systems employing the use of a spotlight.

BACKGROUND OF THE INVENTION

Some vehicles include spotlights such as roof marker lights, which typically project a light beam in a single predefined direction. Accordingly, such spotlights are rather limited in their functionality. Accordingly, there is a need for a spotlight that provides an operator with a means to control the directionality of the light beam.

SUMMARY OF THE INVENTION

According to one aspect of the present invention, a lighting system is provided. The lighting system includes a spotlight is mounted to a vehicle, a controller for operating the spotlight, and a pointer device for specifying an intended target. The controller aims the spotlight in the direction of the intended target based on input provided by the pointer device.

According to another aspect of the present invention, a lighting system is provided and includes a spotlight mounted to a vehicle, a controller for operating the spotlight, and a pointer device for specifying an intended target. The pointer device includes a vision-based sensor for capturing images in a targeted direction of the pointer device, and a positional sensor for determining a heading of the pointer device. The controller aims the spotlight in the direction of the intended target based on image data and the determined heading.

According to yet another aspect of the present invention, a lighting method is provided and includes mounting a spotlight to a vehicle, operating the spotlight using a controller, and using a pointing device to specify an intended target, wherein the controller aims the spotlight in the direction of the intended target based on input provided by the pointer device.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
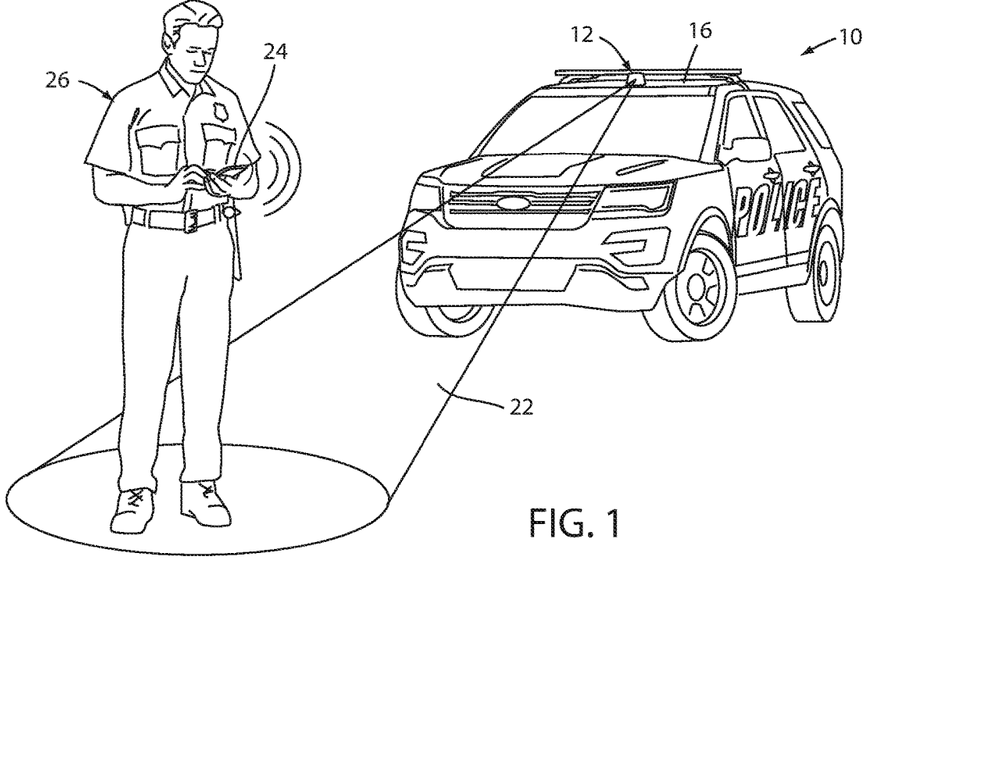
FIG. 1 illustrates a vehicle equipped with a spotlight having multi-directional lighting, according to one embodiment.
Figure 2:
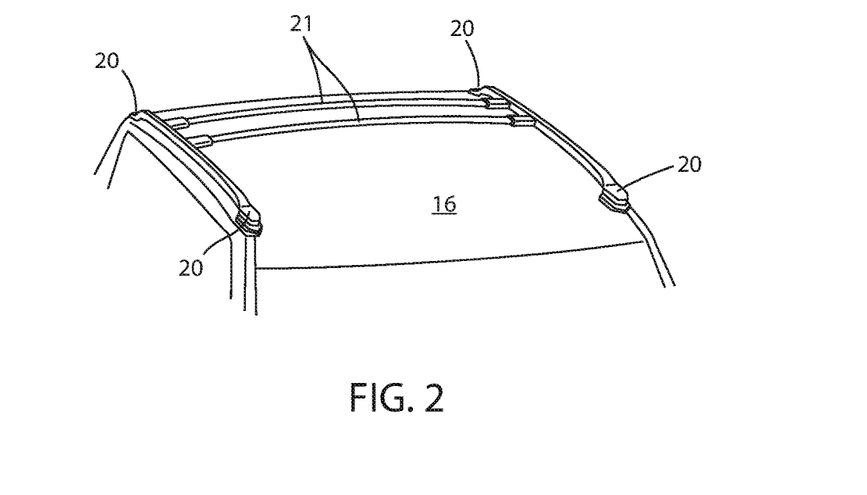
FIG. 2 illustrates a roof rack and points thereon for alternative placement of the spotlight.

Referring to FIG. 1, a vehicle 10 is generally depicted as a sports utility vehicle (SUV). A spotlight 12, exemplarily configured as a roof marker light, is provided on a roof structure 16 of the vehicle 10, the roof structure 16 being generally depicted as a roof panel. In alternative embodiments, the spotlight 12 may be provided elsewhere on the vehicle 10. For example, the spotlight 12 may be packaged in a roof rack 18 of the vehicle 10 at a corner portion 20 or a cross bar 21 (FIG. 2). While a single spotlight 12 is depicted in FIG. 1, it is to be understood that the vehicle 10 may be equipped with multiple spotlights located variously on the roof structure 16 or elsewhere on the vehicle 10. In operation, the spotlight 12 is configured to project a light beam 22 away from the vehicle 10. The directionality of the light beam 22 may be controlled using a remote device 24 generally depicted as a smartphone, but may also include vehicle equipment such as a center console. Accordingly, it is to be understood that the remote device 24 may include portable and non-portable electronic devices. In operation, an operator 26 may utilize the remote device 24 to aim the light beam 22 in a variety of directions to suit his or her needs. Furthermore, in portable embodiments of the remote device 24, the operator 26 may aim the light beam 22 whilst the operator 26 is inside or outside the vehicle 10. In some embodiments, the spotlight 12 is operable such that the directionality of the light beam 22 is determined based on a sensed location of the remote device 24. As exemplarily shown in FIG. 1, the light beam 22 is directed to illuminate the ground below and/or next to the operator 26 carrying the remote device 24. Thus, as the operator 26 moves relative to the vehicle 10, the light beam 22 effectively follows the operator 26 so long as the remote device 24 is detected. It will be apparent to those skilled in the art that these and other features of the spotlight 12, as described herein, may be variously implemented in a multitude of applications. Thus, while the present disclosure provides some exemplary scenarios, those skilled in the art will undoubtedly recognize other ways in which to use the spotlight 12 without departing from the teachings provided herein.

Figure 3:
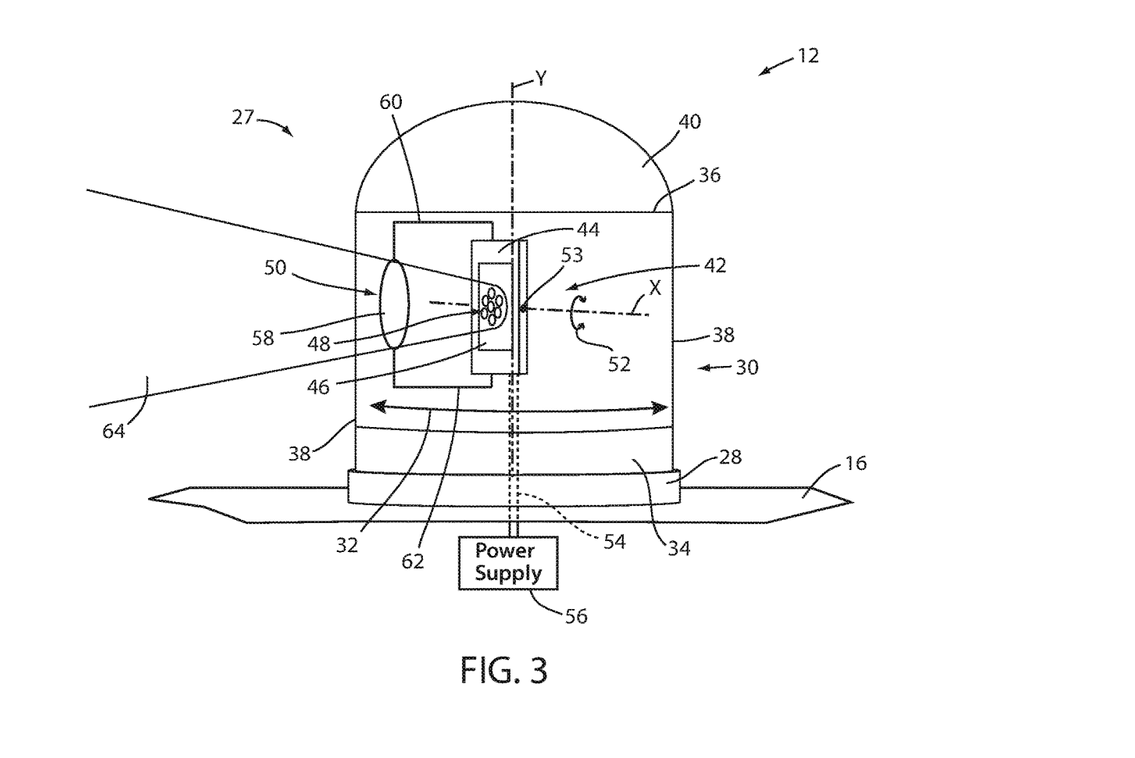
FIG. 3 illustrates the spotlight according to one embodiment.

Referring to FIG. 3, the spotlight 12 is shown according to one embodiment and includes a housing assembly 27 pivotally coupled to the roof structure 16. The housing assembly 27 includes a circular planar base 28 affixed to the roof structure 16 using mechanical fasteners or other known means. The base 28 may be constructed from a rigid material. The housing assembly 27 also includes a cylindrical body 30 concentrically aligned with the base 28 and coupled thereto to pivot about a vertical axis Y extending through the common center of the body 30 and the base 28 such that the body 30 is rotatable in either a leftward direction or a rightward direction as generally represented by dual directional arrow 32. It is contemplated that the body 30 may be fully rotatable (e.g., 360 degrees) or otherwise limited to a degree of rotation in one or both the leftward and rightward directions. The body 30 may be constructed from a rigid material and is defined by a closed bottom end 34 most proximate to the base 28, an open top end 36, and a light-transmissive peripheral wall 38 extending vertically between the bottom and top ends 34, 36. A cover 40 is affixed to the top end 36 of the body 30 and generally functions to seal the contents thereof. The cover 40 may be rounded and constructed from a rigid or elastic material. Additionally, the cover 40 may be light-transmissive or light-blocking.

With continued reference to FIG. 3, a light assembly 42 is pivotally disposed inside the body 30 of the housing assembly 27 and includes a substrate 44 configured to support a printed circuit board (PCB) 46 having a light-emitting diode (LED) arrangement 48 thereon and an optional lens assembly 50 in optical communication with the LED arrangement 48. The substrate 44 is secured within the body 30 and is pivotable about a horizontal axis X extending laterally across the middle of the substrate 44 such that the substrate 44 and components supported thereby can be rotated in either an upward direction or a downward direction as generally represented by dual directional arrow 52. In some embodiments, the horizontal axis X may intersect with the vertical axis Y such that the light assembly 42 is rotatable in a leftward/rightward direction and an upward/downward direction about a point of intersection 53 between the horizontal axis X and the vertical axis Y. The degree of rotation in both the upward and downward directions may be unrestricted or otherwise limited. According to one embodiment, the degree of rotation in both the upward and downward direction is limited to approximately 30 degrees.

While the substrate 44 is depicted as being planar, it may be curved in alternative embodiments. In embodiments where the substrate 44 is curved, the PCB 46 may be configured as a flex circuit to match the contour of the substrate 44. The LED arrangement 48 may include a cluster of LEDs configured to emit light towards the lens assembly 50. The LED arrangement 48 may emit light of the same color or be apportioned to selectively emit different colored light. Electrical power is supplied to the LED arrangement 48 via wiring 54 extending through the substrate 44 and the bottom end 34 of the body 30 and electrically coupled to a vehicle power supply 56. The lens assembly 50 includes a lens 58 supported by a pair of arms 60, 62 connected to the substrate 44. The lens 58 is positioned between the LED arrangement 48 and the peripheral wall 38 of the body 30 and is configured to focus, collimate, or spread light emitted by the LED arrangement 48 so as to project a light beam 64 of variable light density outwardly from the body 30 through the peripheral wall 38. In embodiments where the lens 58 collimates light emitted by LED arrangement 48, the lens 58 may be fluted, the flutes having varying width, height, and depth. Furthermore, the beam pattern of the projected light beam 64 may be defined based on an optical interaction between the lens 58 and the peripheral wall 38. Accordingly, it is to be appreciated that the peripheral wall 38 may be configured to exhibit various optical characteristics.

Figure 4:
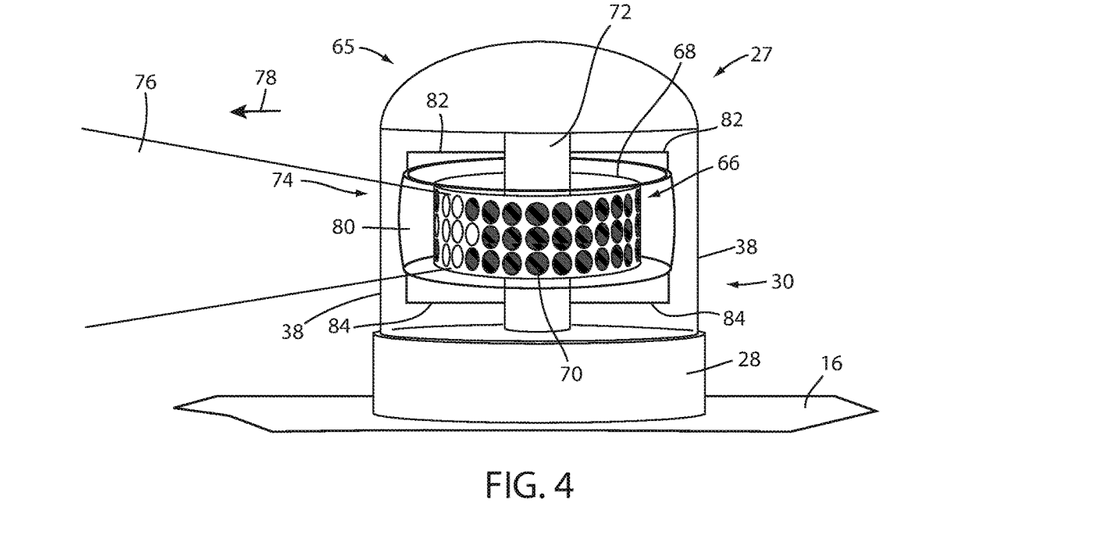
FIG. 4 illustrates the spotlight according to another embodiment.

Referring to FIG. 4, a spotlight 65 is shown according to an alternative embodiment. The spotlight 65 includes the housing assembly 27 described above with reference to FIG. 2. However, in the presently depicted embodiment, the body 30 is not pivotally coupled to the base 28. As such, the base 28 may be omitted in favor of directly coupling the body 30 to the roof structure 16. Alternatively, the body 30 and base 28 may be unitary in construction. A light assembly 66 is provided inside the housing assembly 27 and includes a multi-directional light array defined by a PCB 68 having a circular arrangement and a plurality of LEDs 70 disposed thereon. The PCB 68 may be a flex circuit and is supported by a substrate 72 fixedly secured within the housing assembly 27. As shown, the plurality of LEDs 70 are exemplarily arranged in three rows of equal number and span a substantial entirety of the PCB 68. In alternative embodiments, the number of rows may be different in number along with pattern in which the LEDs 70 are distributed. For purposes of illustration, an arbitrary number of LEDs 70 are undarkened to represent an LED cluster that is selectively activated to emit light outwardly from the body 30 through the peripheral wall 38. It should be appreciated that other LED clusters may be activated to emit light having a different directionality by virtue of the location of the LED clusters on the PCB 68. Furthermore, by modifying the number of LEDs 70 in a given cluster, the intensity and/or spread of the associated light emission may be adjusted. With respect to the embodiments described herein, the intensity of the emitted light may also be adjusted through pulse-width modulation (PWM) or direct current control.

With respect to the presently depicted embodiment, a lens assembly 74 may be optionally provided to focus, collimate, or spread light emitted by the LED cluster so as to project a light beam 76 of variable light density outwardly from the body 30 through the peripheral wall 38 in the direction generally specified by arrow 78. The lens assembly 74 includes a lens 80 in optical communication with the LEDs 70 and is fixedly supported within the housing assembly 27 by any suitable means. The lens 80 may be positioned between the multi-directional light array and the peripheral wall 38 and may be secured by one or more pairs of arms 82, 84 connected to the substrate 72 or otherwise secured within the housing assembly 27. The lens 80 is generally positioned inside the housing assembly 27 to intercept light emitted from the LEDs 70 and project the corresponding light beam through the peripheral wall 38 of the body 30. In some embodiments, the lens 80 may be fluted, the flutes having varying width, height, and depth. Also, the projected light beam 76 may be defined based on an optical interaction between the lens 80 and the peripheral wall 38. Accordingly, it is to be appreciated that the peripheral wall 38 may be configured to exhibit various optical characteristics.

In the depicted embodiment, the lens 80 is configured to enclose the multi-dimensional light array. That is, when the spotlight 65 is viewed from the top, the multi-dimensional array is a small circle enclosed by a larger circle corresponding to the lens 80. The lens 80 may be configured to project a light beam in a straight forward direction or otherwise project the light beam at an upward or downward angle relative to the ground. While the multi-directional light array has been shown to provide 360 degree lighting, it is to be understood that the multi-directional light array may be limited to smaller degree ranges, thereby limiting the available directionality of a light emitted by the LEDs 70, if desired.

Due to the lack of any movable parts, the spotlight 65 described with reference to FIG. 4 may be manufactured at a lower cost when compared to that described with reference to FIG. 2. Furthermore, the lack of movable parts also enables the spotlight 65 to benefit from a smaller size, thereby enabling it to be more easily integrated with various structures of the vehicle 10 (e.g., roof rack 18; FIG. 1). While the housing assembly 27 of spotlights 12 and 65 has been described herein as having a particular disposition, it is to be understood that the housing assembly 27 may take on other shapes and configurations to adapt to various structures of the vehicle 10 without adversely impacting the functionality of the spotlight 12, 65.

Figure 5:
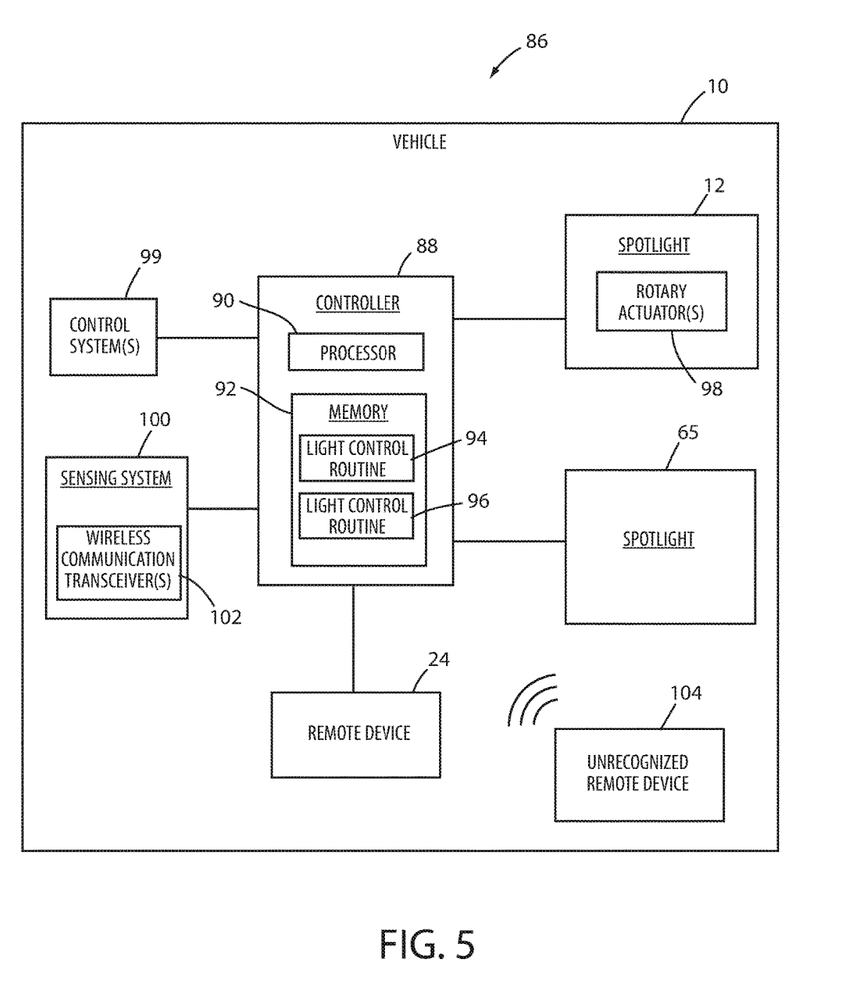
FIG. 5 is a block diagram of a lighting system that includes the spotlights of FIGS. 3 and 4.

Referring to FIG. 5, a lighting system 86 is shown according to one embodiment and exemplarily includes spotlights 12 and 65, each of which may be mounted to the same or different structure of the vehicle 10. As shown a controller 88 is operably coupled to each spotlight 12, 65. In alternative embodiments, each spotlight 12, 65 may be controlled by a separate controller located on their respective PCBs 46, 68 or elsewhere located in the vehicle 10. In the presently depicted embodiment, the controller 88 may be a dedicated controller or may be shared with other vehicle equipment. The controller 88 includes a processor 90 and a memory 92 for storing one or more routines that are executable by the processor 90. For example, the memory 92 may store a light control routine 94 for controlling spotlight 12 and another light control routine 96 for controlling spotlight 65.

According to one embodiment, the controller 88 operates spotlights 12, 65 based on input received from the remote device 24. Accordingly, the light control routines 94, 96 may also include instructions allowing communication between the controller 88 and the remote device 24. Alternatively, such instructions may be embodied in a separate routine stored in the memory 92 of the controller 88. As described herein, the remote device 24 may include a portable electronic device such as a smartphone or vehicle equipment such as a center console. In embodiments where the remote device 24 is a portable electronic device, an operator may use the remote device 24 to wirelessly communicate with the controller 88 via any known wireless communication protocol such as Bluetooth, Bluetooth Low Energy (BLE), Wi-Fi, and the like. Accordingly, the remote device 24 may include one or more routines for enabling communication between the remote device 24 and the controller 88. For example, in smartphone embodiments of the remote device 24, the smartphone may include an application enabling the operator to activate the spotlights 12, 65 and effectively aim the direction in which to project a light beam.

In regards to spotlight 12, the operator may use the smartphone to enter commands for turning ON the light assembly 42 as well as rotating the body 30 of the housing assembly 27 and/or the light assembly 42 in order to aim the light beam in a desired direction. Thus, by virtue of the body 30 and the light assembly 42 being pivotable, the operator is able to aim the light beam in a left/right rotational direction and an up/down rotational direction, thereby adjusting the directionality of the light beam in two dimensions. In such embodiments, the spotlight 12 may include one or more rotary actuators 98 operably coupled to the controller 88 for achieving rotational movement of the body 30 and light assembly 42.

In regards to spotlight 65, the operator may similarly use the smartphone for turning ON the light assembly 66. For example, the operator may enter commands through the smartphone that are inputted to the controller 88 for selectively activating an LED cluster. In this instance, the directionality of the resultant light beam is based on the location of the activated LED cluster within the housing assembly 27. It is contemplated that the number of LEDs 70 in a selected LED cluster may be modified using the remote device 24 or is predefined by the vehicle manufacturer. Since the light assembly 66 of spotlight 65 does not provide upward or downward aiming of a light beam, the operator is generally limited to aiming the light beam in a leftward or rightward direction by selectively activating the appropriate LED cluster. However, it is contemplated that the light assembly 66 may be configured such that a light beam may be aimed in an upward direction or a downward direction if desired. However, doing so may increase the packaging requirements of the spotlight 65. With respect to the operation of spotlights 12 and 65, it is also contemplated that the operator may input commands using the remote device 24 for controlling the intensity and color of a light beam.

In embodiments where the remote device 24 is a center console or other vehicle equipment, the operator may input commands for controlling the spotlights 12, 65 in a similar manner as that described above with respect to the smartphone. The vehicle equipment may be connected to the controller 88 and made to communicate with the same via a vehicle network such as a CAN bus, a LIN bus, or the like. In any of the embodiments described herein, the remote device 24 may include a touchscreen with which the operator may input his or her commands.

In operation, the controller 88 may operate the spotlights 12, 65 to effectuate a variety of lighting controls based on input from the remote device 24. For example, an operator may input commands using the remote device 24 to aim a light beam toward a desired location in order to perform a task in dark conditions. Selective aiming of a light beam may prove especially useful in certain professions, such as law enforcement, where an officer may use the remote device 24 to aim the light beam towards a suspected offender or vehicle that has been pulled over due to a traffic violation, for example. Other professionals such as firemen, paramedics, etc. may similarly benefit. In some embodiments, the controller 88 may communicate with one or more control systems 99 of the vehicle 10 and operate the spotlights 12, 65 in response to information received from the control systems 99. For example, if mounted toward the rear of the vehicle 10, the spotlights 12, 65 may be operated as backup lights based on an indication that the vehicle 10 is placed in reverse. If mounted toward the front of the vehicle 10, the spotlights 12, 65 may be operated as headlights or cornering lights when the vehicle 10 based on an indication that the vehicle 10 is in drive or engaged in a turning maneuver. These are but a few exemplary scenarios showcasing the utility of the spotlights 12, 65 described herein. It is to be understood that the spotlights 12, 65 may be variously operated by the controller 88 in other scenarios based on input from the remote device 24 and/or the control system(s) 99 of the vehicle 10.

With further reference to FIG. 5, the lighting system 86 may include a sensing system 100 operably coupled to the controller 88 for detecting the location of the remote device 24. The sensing system 100 may include one or more wireless communication transceivers 102 configured to interact with the remote device 24. The wireless communication transceiver(s) 102 may communicate with the remote device 24 over a wireless signal (e.g., radio frequency). In a specific example, the wireless communication transceiver(s) 102 may be a Bluetooth™ RN4020 module or an RN4020 Bluetooth™ low energy PICtail board configured to communicate with the remote device 24 using Bluetooth™ low energy signals. The wireless communication transceiver(s) 102 may include a transmitter and a receiver to transmit and receive wireless signals (e.g., Bluetooth™ signals) to and from the remote device 24. It will be appreciated that the wireless communication transceiver(s) 102 may utilize other forms of wireless communication with the remote device 24 such as Wi-Fi™. The wireless communication transceiver(s) 102 may be positioned on or within the controller 88 or be located elsewhere on the vehicle 10. For example, some or all of the wireless communication transceiver(s) 102 may be located at a rear, side, and/or front portion of the vehicle 10.

The controller 88 and/or the remote device 24 may include one or more routines which control the communication between the wireless communication transceiver(s) 102 and the remote device 24. For example, instructions for controlling the communication between the wireless communication transceiver(s) 102 and the remote device 24 may be included in the light control routines 94, 96 and executed by the processor 90 of the controller 88. In operation, the remote device 24 may communicate with all, some, or none of the wireless communication transceiver(s) 102 as the remote device 24 enters and exits the communication range of the wireless communication transceiver(s) 102. The wireless communication transceiver(s) 102 may be aware of its location within the vehicle 10 and is capable of sharing its location with the remote device 24. In various embodiments, the wireless communication transceiver(s) 102 are capable of communicating with the remote device 24 such that the location of the remote device 24 may be determined therefrom (e.g., based on signal strength and/or return time of the signal) or vice versa.

According to one embodiment, the controller 88 may utilize the signal strength and time to return of the signals between the wireless communication transceiver(s) 102 and the remote device 24 to triangulate the position of the remote device 24 as the person carrying it is approaching or leaving the vehicle 10. In response, the controller 88 may operate one or both of the spotlights 12, 65 to project a light beam that effectively follows the remote device 24, if possible. As defined herein, the term "follow" may be construed to mean that the light beam is projected directly toward the location of the remote device 24 or toward a location in close proximity thereof. For example, in smartphone embodiments of the remote device 24, the smartphone is generally carried in a person's pocket or hand, and as such, the controller 88 may be configured to operate the spot lights 12, 65 to project a light beam below the position of the smartphone so as to illuminate the ground below or proximate the person. The remote device 24 and/or controller 88 may store user specific data and preferences relating to the operation of the spot lights 12, 65 (e.g., color, intensity, pattern, activation distance, etc.).

Choosing whether the remote device 24 should be trusted and therefore given access to communicate with the controller 88 and the wireless communication transceiver(s) 102 may be determined based on whether the remote device 24 has been inside of the vehicle 10 before. According to one embodiment, the memory 92 of the controller 88 may store identifying information relating to remote devices 24 which were detected within the vehicle 10 and which may therefore be generally regarded as "friendly" and/or as the owner of the vehicle 10. In an exemplary method of determining that an unknown remote device 24 is friendly, the wireless communication transceiver(s) 102 detect the presence of an unknown remote device 24, detect a characteristic signal shift (e.g., attenuation or increase in signal at the wireless communication transceiver(s) 102) indicative of the unknown remote device 24 entering or being within the vehicle 10 across multiple wireless communication transceiver(s) 102, and store characteristic information about the remote device 24 for future identification. It will be understood that a determination of the location of the remote device 24 to be within the vehicle 10 may also prompt a storing of the characteristic information on the remote device 24 for future identification. Utilizing the past and/or present location of the remote device 24 as a security feature to determine if it is allowed access to the controller 88 may be particularly advantageous as the replication of signal shifting indicative of the remote device 24 entering the vehicle 10 and the location of the remote device 24 is particularly difficult to fake. Further, it will be understood that more conventional methods of connecting portable electronic devices such as pairing and manually connecting may also be utilized to designate one or more remote devices 24 as being friendly.

The detecting capabilities of the wireless communication transceiver(s) also permits the controller 88 to determine if an unrecognized remote device 104 is proximate the vehicle 10. Such an unrecognized remote device 104 may be owned or carried by a potential burglar or threat to the vehicle 10. In events where an unrecognized remote device 104 is detected proximate the vehicle 10 for greater than a predetermined time, the controller 88 may initiate one or more counter measures. Countermeasures may include strobing the spotlights 12, 65 or projecting a light beam at the unrecognized remote device 104, effectively following the person carrying the unrecognized remote device 104. In some embodiments, any available identifying information about the unrecognized remote device 104 may be stored for later retrieval in instances where the friendly remote device 24 is not detected proximate the vehicle 10 at the same time, for example. The controller 88 may store the identifying information in its memory 92. Such identifying information may prove useful in the event the vehicle 10 becomes compromised due to theft, damage, and the like.

Thus far, the above-described embodiments detail a spotlight (e.g., spotlights 12, 65) that projects a light beam that effectively follows an operator of a remote device (e.g., remote device 24). However, it is further contemplated herein that the spotlight may be operated instead to direct the light beam towards an intended target. Such an implementation is particularly beneficial to law enforcement and enables a police officer in possession of the remote device to effectively aim the light beam towards the intended target, which may include, for example, a person of interest (e.g., an assailant), an object of interest (e.g., vehicle that has been pulled over), or a general area in the operating environment of a police vehicle. As will be described in greater detail below, the intended target may be specified using a pointer device equipped with the remote device. For purposes of illustration and understanding, the pointer device is exemplarily described herein as being a firearm. However, it is to be understood that the pointer device may additionally include a flashlight, a conducted electrical weapon (CEW), a pepper spray device, or any other device available to law enforcement and/or generally aimed at a target.

Figure 6:
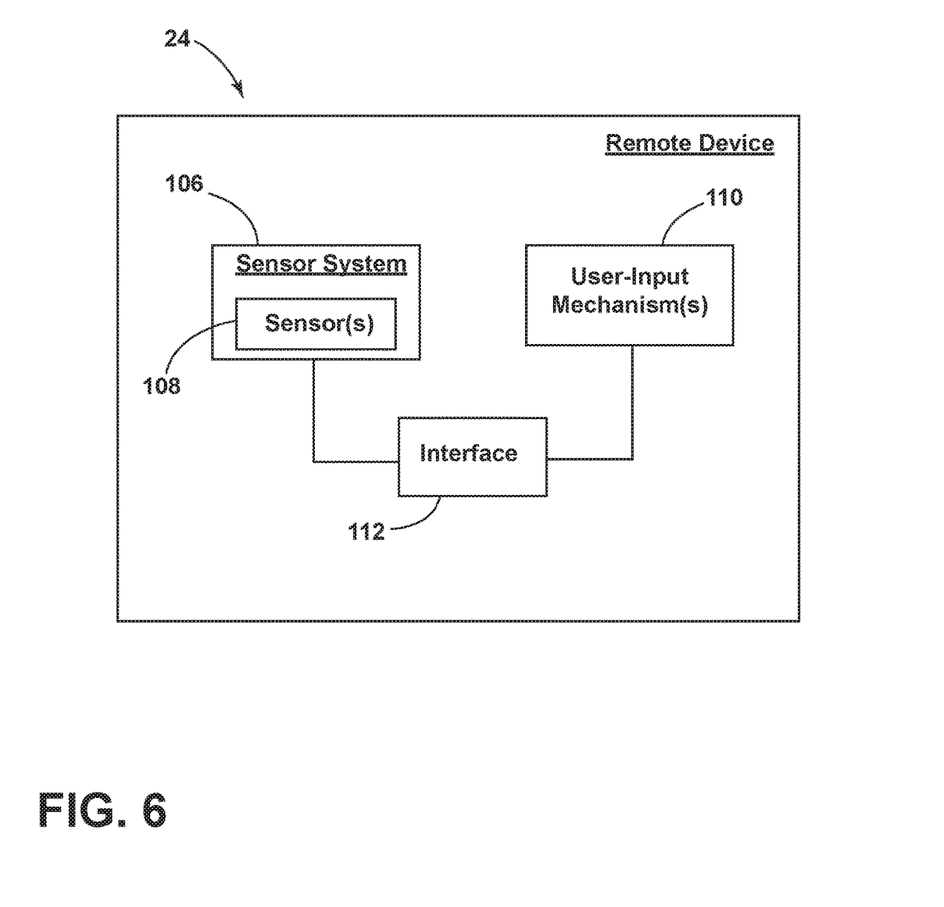
FIG. 6 is a block diagram of remote device according to one embodiment.

Referring to FIG. 6, the remote device 24 is shown according to one embodiment. The remote device 24 includes a sensor system 106 having one or more sensors 108 including, but not limited to, GPS, a compass, accelerometer(s), orientation sensor(s), gravity sensor(s), LIDAR, radar, infrared (IR) sensor(s), ultrasonic sensor(s), vision-based sensor(s), or a combination thereof. The remote device 24 also includes one or more user-input mechanisms 110 for controlling the operation of one or more spotlights, which may be configured as spotlights 12 and/or 65. The remote device 24 further includes an interface 112 that enables wireless communication between the remote device 24 and the wireless communication transceiver(s) 102 of the lighting system 86 described previously with respect to FIG. 5. Such communication may include input provided by the sensor(s) 108, the user-input mechanism(s) 110, or a combination thereof. The wireless communication transceiver(s) 102 supplies the input to the controller 88, which responds by operating the spotlight(s) based on the input provided by the remote device 24.

Figure 7:
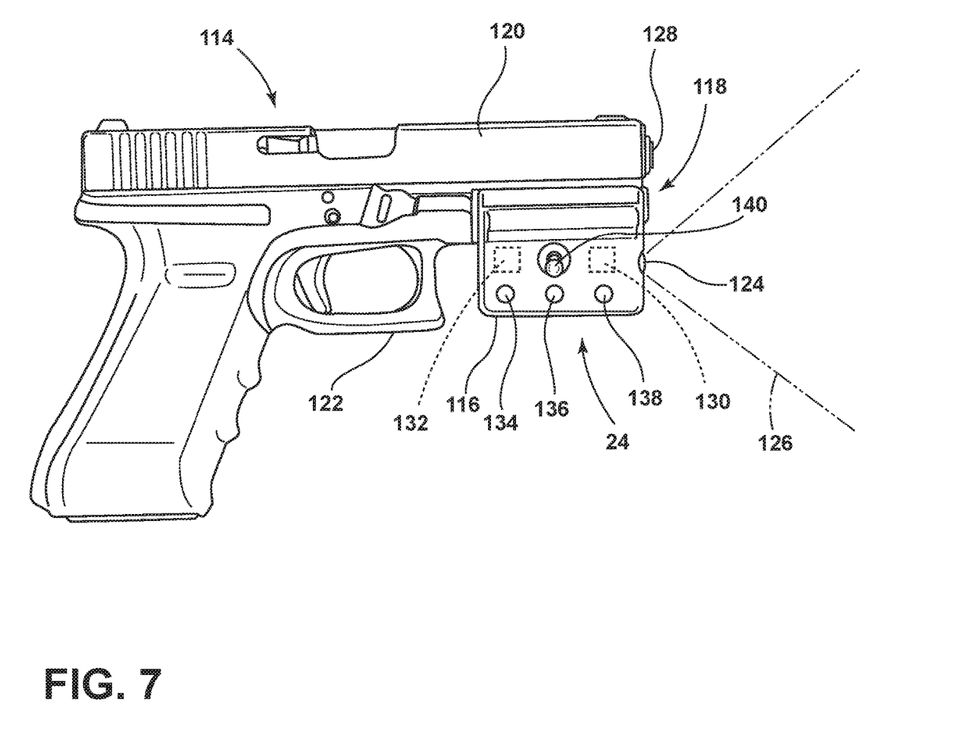
FIG. 7 illustrates the remote device of FIG. 6 embodied as a pointer device in the form of a firearm.

Referring to FIG. 7, the remote device 24 of FIG. 6 is shown embodied as a pointer device in the form of a firearm 114. The firearm 114 includes a housing 116 conventionally mounted to a rail 118 of the firearm 114. The rail 118 is generally provided below a slide 120 and forward of a trigger guard 122, and may be configured as a Picatinny rail, a dovetail rail, or any other conventional rail. In the depicted embodiment, the housing 116 includes a vision-based sensor 124 (e.g., a light sensor array or CCD camera) having a field of view 126 for capturing images of a scene in front of a barrel 128 of the firearm 114. In this manner, the vision-based sensor 124 is able to capture images in a targeted direction of the firearm 114. The captured images may be processed using conventional techniques to identify a target and/or a target distance, for example. It is conceived that image processing may be performed by an image processor inside the housing 116 or controller 88. Additionally or alternatively, the housing 116 may include one or more object detection sensors 130 for measuring distance to a target located in the targeted direction of the firearm 114. For example, the sensor 130 may be LIDAR, radar, IR, ultrasonic, or a combination thereof.

With continued reference to FIG. 7, the housing 116 may include one or more positional sensors 132 such as, but not limited to, a GPS, a compass, an accelerometer, an orientation sensor, a gravity sensor, or a combination thereof. For example, the positional sensor(s) 132 may include a compass for determining a heading in which the firearm 114 is aimed. Additionally or alternatively, the positional sensor(s) 132 may include an accelerometer, an orientation sensor, and/or other positional sensor(s) to determine a spatial orientation of the firearm 114 such as a relative angle between the firearm 114 and the ground.

In the depicted embodiment, a number of user-input mechanisms 110 provided on the housing 116 are exemplarily embodied as buttons 134, 136, and 138, and joystick 140. According to one embodiment, button 134 toggles a spotlight between an ON state and an OFF state, button 136 modifies a beam spread of the spotlight, button 138 may freeze the light beam on an intended target, and the joystick 140 is operated to adjust the aim of the light beam projected from the spotlight. While the user-input mechanisms 110 are shown located on one side of the housing 116, it is contemplated that they may be alternatively or additionally provided on the opposing side of the housing 116 based on the shooting hand of a user. Furthermore, while the housing 116 has been generally described as a modular unit, it is conceived that certain components may be provided separate from the housing 116 in alternative embodiments. For example, the joystick 140 may be located towards the rear of the firearm 114 and made accessible using a thumb of the shooting hand. In some embodiments, the vision-based sensor 124 may be mounted atop the slide 120.

Figure 8:
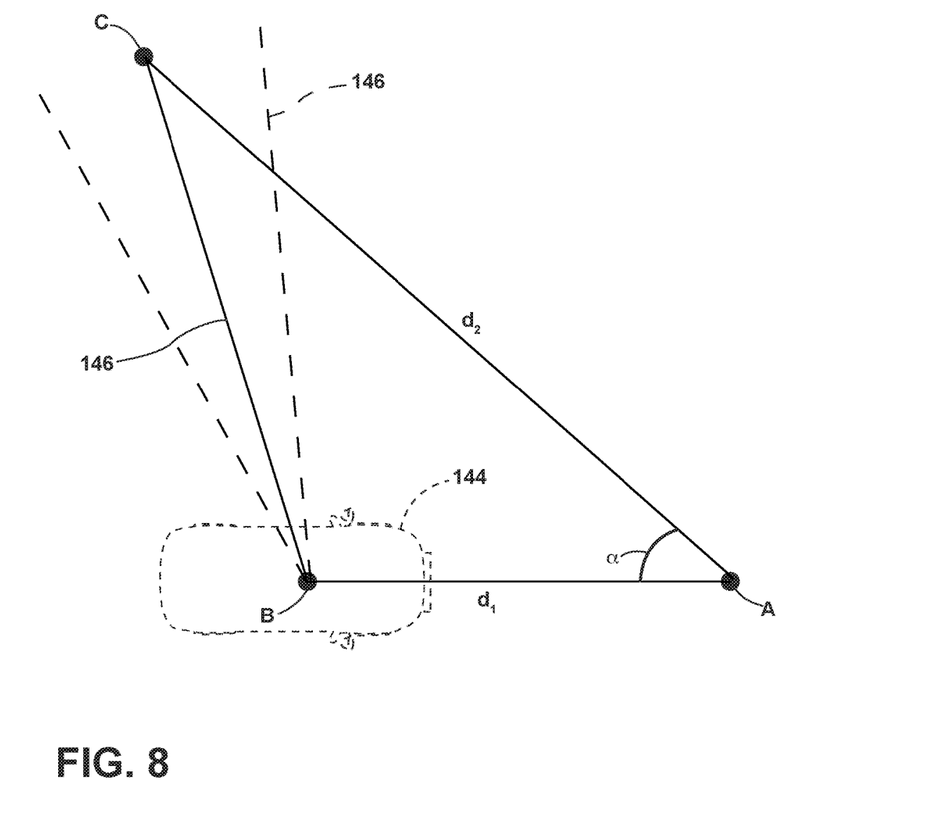
FIG. 8 illustrates a lighting system is shown employing the use of the pointer device of FIGS. 6 and 7.

Referring to FIG. 8, an exemplary scenario is shown to describe various operations achievable using the firearm 114 described herein with reference to FIGS. 6 and 7. For purposes of understanding, point A generally represents the firearm 114. Point B generally represents a spotlight, which may be configured according to any of the embodiments described herein (e.g., spotlight 12 or 65). The spotlight may be provided on a roof structure of a police vehicle 144 and projects a light beam 146 having beam axis 148 in a direction specified by the controller 88. In the depicted scenario, the light beam 146 is aimed toward an intended target generally represented by Point C. The intended target may include a person, vehicle, or other object of interest. With respect to the present disclosure, it should be understood that the intended target may be stationary or moving.

With continued reference to FIG. 8, point A is located from point B at a distance $d_1$, which the controller 88 may determine by triangulating the position of the firearm 114 based on signal exchanges between the firearm 114 and the wireless communication transceiver(s) 102. Additionally or alternatively, the relative position of the remote device 24 may be determined by other means such as GPS, for example. Point A is located from point C at a distance $d_2$, which is also referred to herein as the distance to target. The distance to target may be determined in several ways. For example, the distance to target may be determined by analyzing captured images taken by vision-based sensor 124. Additionally or alternatively, the distance to target may be determined using sensor(s) 130. The heading (e.g., angle $\alpha$) of the firearm 114 may be determined using positional sensor(s) 132 (e.g., a compass). Based on the heading, distance to target, and relative distance between the vehicle 144 and the firearm 114, the controller 88 may estimate the location of the intended target relative to the spotlight and subsequently operate the spotlight to aim the light beam 146 in the direction of the intended target. In embodiments where the distance to target is unknown, the controller 88 may estimate the location of the intended target based on the heading of the firearm 114 and the relative distance between the vehicle 144 and the firearm 114. Furthermore, in instances where the distance to target is unknown, the controller 88 may operate the spotlight so as to adjust its aim of the light beam 146 slightly toward the firearm 114 to ensure it converges on the intended target. Thus, with respect to the depicted scenario in FIG. 8, the light beam 146 would be rotated slightly rightwards.

In operation, the spotlight may be manually and/or automatically activated or deactivated. According to one implementation, the controller 88 may automatically operate the spotlight based on input received from positional sensor(s) 132. According to one embodiment, the positional sensor(s) 132 may include an orientation sensor and/or gyroscope for providing positional information relative to a frame of reference such as the magnetic north pole. For example, the controller 88 may activate the spotlight in instances where the positional information indicates a likelihood that the firearm 114 has been drawn and an operator has taken aim therewith. In one specific example, the controller 88 may activate the spotlight based on the positional information indicating that the firearm 114 has been raised beyond a degree threshold (e.g., 45 degrees) relative to the ground. In contrast, the controller 88 may deactivate the spotlight in instances where the positional information indicates a likelihood that the firearm 114 has been drawn but the operator has not taken aim. For example, the controller 88 may deactivate the spotlight if the positional information indicates that the firearm is raised at or below the degree threshold relative to the ground. In some embodiments, it is contemplated that a firearm holster may be provided having sensors (e.g., capacitive, break-beam, etc.) for detecting when the firearm 114 has been drawn. In such embodiments, the spotlight is deactivated so long as the firearm 114 is holstered. Alternatively, in instances where the firearm 114 is holstered or the positional information indicates that the firearm 114 has been drawn but the operator has not taken aim, the controller 88 may operate the spotlight such that the light beam 146 follows the operator as described previously herein.

Additionally or alternatively, the controller 88 may operate the spotlight based on user-supplied input transmitted from the firearm 114. For example, the controller 88 may activate the spotlight upon receiving input from the firearm 114 indicating that an operator has pressed button 134. In response to a subsequent press of button 134, the controller 88 may deactivate the spotlight. While the spotlight is activated, the operator may modify the spread of the light beam 146 by pressing button 136 a number of times. According to one embodiment, the light beam 146 has a width of 75 feet at a distance of 25 feet. It is contemplated that subsequent button presses of button 136 may widen and/or narrow the light beam 146. In one specific embodiment, button 136 may be pressed up to three times, whereby each button press serves to increase the width of the light beam 146. A fourth button press may serve to return the width of the light beam 146 to its original default setting. Similar strategies may be incorporated for narrowing the light beam 146 if desired. It is contemplated that an additional button may be provided for narrowing the light beam 146, if desired.

An operator desiring to maintain the light beam 146 in its current position may press button 138 to freeze the light beam 146 on the intended target. While the light beam 146 is frozen in place, automatic and/or manual operation of the spotlight may be temporarily disabled. However, a subsequent press of button 138 may unfreeze the light beam 146 and restore automatic and/or manual operation of the spotlight. Thus, by alternating presses of button 146, the operator may freeze and unfreeze the light beam 146 as desired. In some embodiments, a safeguard may be in place in the event the operator crosses into the light beam 146 while the light beam 146 is frozen or otherwise. For example, the controller 88 may deactivate the spotlight based on a relative position of the firearm 114 with respect to the light beam 146. If the controller 88 determines that the operator using the firearm 114 has crossed into or is about to cross into the light beam 146, the controller 88 may deactivate the light beam to prevent the operator from potentially being blinded by the spotlight.

In instances where the firearm 114 is detected within close proximity to the light beam 146 (e.g., a predetermined distance), it is contemplated that the controller 88 may issue a warning signal to the firearm 114 prompting the same to warn the operator of a potential blinding condition. Such a warning may be visual, auditory, haptic, or a combination thereof. Therefore, it is contemplated that the housing 116 may include lights, speakers, and/or vibratory motors for prompting the warning. Additionally or alternatively, the warning may be generated by an accessory separate from firearm 114. In one specific embodiment, the accessory may be a wearable item (e.g., a wristband, a belt, etc.) configured to alert the operator that he or she is nearing or crossed into the path of the light beam 146. The accessory may include an interface for sending and receiving communications to and from the controller 88 and/or the firearm 114. In some implementations, the controller 88 may triangulate the position of the wearable item thereby determining the relative position of the operator with respect to the vehicle 144. An example of a wearable item is described in U.S. patent application Ser. No. 15/184,381 to Dellock et al., entitled "POLICE VEHICLE MONITOR," filed on Jun. 16, 2016, the entire disclosure of which is incorporated herein by reference. It is contemplated that additional wearables and/or remote devices in the possession of other operators may be recognized by the controller 88, thereby enabling multiple operators to interact with the spotlight.

According to one embodiment, the controller 88 may be a closed loop PID controller and configured to adjust the aim of the spotlight based on image data associated with the captured images taken using the vision-based sensor 124 of the firearm 114. In instances where the light beam 146 is aimed at the intended target, for example, the controller 88 may operate the spotlight to center the light beam 146 onto the intended target. To do so, the controller 88 may analyze light distribution patterns in images captured by the vision-based sensor 124. For example, if the captured images show a greater light distribution (e.g., resulting from the spotlight hitting the intending target) in an off-center area or region, the controller 88 may prompt the spotlight to adjust its aim until the vision-based sensor 124 registers the greater light distribution in its center. By centering the light beam 146 onto the intended target, the operator of the firearm 114 tends to have a better sight picture, which assists the operator in determining whether or not to use the firearm 114. In alternative embodiments, analysis of the captured images may be performed by an image processor inside the housing 116 and results in an input being provided to the controller 88 instructing the same to adjust the aim of the spotlight. Additionally, the operator may manually adjust the aim direction of the light beam 146 via joystick 140.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lighting system comprising:
   a spotlight mounted to a vehicle;
   a controller for operating the spotlight; and
   a pointer device for specifying an intended target of a firearm, wherein the controller aims the spotlight in the direction of the intended target based on input provided by the pointer device.

2. The lighting system of claim 1, wherein the pointer device is coupled to the firearm.

3. The lighting system of claim 1, wherein the input comprises a heading of the pointer device determined by a positional sensor.

4. The lighting system of claim 1, wherein the input comprises a distance to target determined by at least one of a vision-based sensor and an object detection sensor.

5. The lighting system of claim 1, wherein the controller activates or deactivates the spotlight based on input provided by the pointer device indicating a position of the pointer device relative to a frame of reference.

6. The lighting system of claim 1, wherein the controller activates the spotlight if the input indicates that the pointer device is raised beyond a degree threshold relative to a ground, and wherein the controller deactivates the spotlight if the input indicates that the pointer device is raised at or below the degree threshold.

7. The lighting system of claim 1, wherein the controller generates a warning signal when the pointing device is detected to have crossed or is in close proximity to a light beam projected from the spotlight.

8. A lighting system comprising:
a spotlight mounted to a vehicle;
a controller for operating the spotlight; and
a pointer device for specifying an intended target of a firearm and comprising:
   a vision-based sensor for capturing images in a targeted direction of the pointer device; and
   a positional sensor for determining a heading of the pointer device;
   wherein the controller aims the spotlight in the direction of the intended target based on image data and the determined heading.

9. The lighting system of claim 8, wherein the pointer device further comprises one or more user-input mechanisms for activating or deactivating the spotlight.

10. The lighting system of claim 8, wherein the pointer device further comprises one or more user-input mechanisms for freezing or unfreezing a light beam projected by the spotlight.

11. The lighting system of claim 8, wherein the pointer device further comprises one or more user-input mechanisms for altering a spread of a light beam projected by the spotlight.

12. The lighting system of claim 8, wherein the pointer device further comprises a user-input mechanism for adjusting the direction in which the spotlight is aimed.

13. The lighting system of claim 8, wherein the controller adjusts the direction in which the spotlight is aimed based on light distribution patterns in images captured by the vision-based sensor.

14. A lighting method comprising:
mounting a spotlight to a vehicle;
operating the spotlight using a controller; and
using a pointing device to specify an intended target of a firearm, wherein the controller aims the spotlight in the direction of the intended target based on input provided by the pointer device.

15. The lighting method of claim 14, wherein the pointer device is coupled to the firearm.

16. The lighting method of claim 14, wherein the input comprises a heading of the pointer device determined by a positional sensor.

17. The lighting method of claim 14, wherein the input comprises a distance to target determined by at least one of a vision-based sensor and an object detection sensor.

18. The lighting method of claim 14, wherein the controller activates or deactivates the spotlight based on input provided by the pointer device indicating a position of the pointer device relative to a frame of reference.

19. The lighting method of claim 14, wherein the controller activates the spotlight if the input indicates that the pointer device is raised beyond a degree threshold relative to a ground, and wherein the controller deactivates the spotlight if the input indicates that the pointer device is raised at or below the degree threshold.

20. The lighting method of claim 14, wherein the controller generates a warning signal when the pointing device is detected to have crossed or is in close proximity to a light beam projected from the spotlight.

* * * * *